United States Patent [19]

Akatsu et al.

[11] 3,949,270
[45] Apr. 6, 1976

[54] HIGH VOLTAGE REGULATING CIRCUIT

[75] Inventors: Mitsuharu Akatsu, Yokohama; Gentaro Miyazaki, Fujisawa, both of Japan

[73] Assignee: Hitachi, Ltd., Japan

[22] Filed: Jan. 28, 1971

[21] Appl. No.: 110,707

[30] Foreign Application Priority Data
Feb. 4, 1970  Japan............................... 45-9813

[52] U.S. Cl. ................. 315/411; 315/402; 315/410
[51] Int. Cl.² .......................................... H01J 29/70
[58] Field of Search ............................. 315/27–29, 315/402, 410, 411

[56] References Cited
UNITED STATES PATENTS

| | | | |
|---|---|---|---|
| 2,697,798 | 12/1954 | Schlesinger | 315/28 |
| 2,997,622 | 8/1961 | Claypool | 315/29 |
| 3,721,858 | 3/1973 | Shimizu | 315/28 |

Primary Examiner—Maynard R. Wilbur
Assistant Examiner—S. C. Buczinski
Attorney, Agent, or Firm—Craig & Antonelli

[57] ABSTRACT

A high voltage regulating circuit has a cathode-ray tube, horizontal deflection means comprising a horizontal deflection output transistor and a horizontal deflection coil for generating a saw-tooth current therein, high voltage generating means connected with the anode of the cathode-ray tube for supplying a high D.C. voltage to the anode thereof and comprising a high voltage generating output transistor, a flyback transformer and a high voltage rectifier, a voltage source, a variable impedance means connected between the voltage source and the high voltage generating means, and a control signal supply means. The control signal is supplied to the impedance means to control the impedance thereof so as to control the voltage supplied to the high voltage generating means thereby maintaining constant the high D.C. voltage supplied to the anode of the cathode-ray tube.

14 Claims, 7 Drawing Figures

HIGH VOLTAGE REGULATING CIRCUIT

BACKGROUND OF THE INVENTION

1. Field of the Invention

This invention relates to a high voltage regulating circuit for maintaining constant the high voltage supplied to the anode of a cathode-ray tube. More particularly, this invention relates to a high voltage regulating circuit for a television receiver which includes two output transistors disposed in the horizontal deflection and high voltage generating circuit so that one of the transistors acts as a horizontal deflection output transistor while the other acts as a high voltage generating output transistor.

The present invention is especially suitable for use in a transistorized color television receiver.

2. Description of the Prior Art

In a color television receiver which generally employs three electron guns, large power at high voltages is required compared with a black-and-white television receiver and large current flows through the anode of the cathode-ray tube. In addition, the transmission of D.C. components of a video signal is accompanied by a large variation of the mean anode current depending on the content of the video signal. This results in a wide variation of the high voltage and exerts a great influence on the operation of the horizontal deflection circuit, thereby causing a variation of the amplitude of the raster, improper focusing, out of convergence and other undesirable phenomena. In order to avoid the above trouble, it is necessary to stabilize the high voltage supplied to the anode of the cathode-ray tube.

A typical conventional high voltage regulating circuit includes a shunt regulator tube connected in parallel with the load of the high voltage generating circuit, that is, the cathode-ray tube. However, the shunt regulator tube is defective in many points including low reliability due to deterioration of the operating characteristics resulting from lapse of time or reduced emission, liability to failure and tendency toward radiation of X-rays in large quantities.

On the other hand, a so-called separated horizontal deflection-high voltage generation system is employed in a modern transistorized color television receiver when there is no margin in the voltage-current rating of the horizontal deflection output transistor. According to the separated horizontal deflection-high voltage generation system, the horizontal deflection and high voltage generating circuit is divided into a horizontal deflection circuit and a high voltage generating circuit, and individual output transistors are disposed in the horizontal deflection circuit and the high voltage generating circuit respectively. However, due to the fact that a shunt regulator tube is used in this separated horizontal deflection-high voltage generation system too for the purpose of stabilizing the high voltage, defects as pointed out above are unavoidable in this high voltage regulating circuit also.

SUMMARY OF THE INVENTION

It is an object of the present invention to provide a novel and useful high voltage regulating circuit for use in the cathode-ray tube circuit of television receivers and the like for maintaining constant the high voltage supplied to the anode of the cathode-ray tube.

Another object of the present invention is to provide a highly reliable high voltage regulating circuit which is free from any deterioraton in its operating characteristics due to lapse of time.

A further object of the present invention is to provide a highly stable and reliable high voltage regulating circuit which obviates the defects encountered with prior art high voltage regulating circuits employing a shunt regulator tube and which can be effectively used in a color television receiver employing a separated horizontal deflection-high voltage generation system.

In accordance with one feature of the present invention, there is provided a high voltage regulating circuit comprising a cathode-ray tube having at least a cathode, a grid and an anode, horizontal deflection means including a horizontal deflection output transistor and a horizontal deflection coil connected with the output terminal of said horizontal deflection output transistor for generating a saw-tooth current therein, high voltage generating means connected with said anode of said cathode-ray tube for supplying a high D.C. voltage thereto and including a high voltage generating output transistor, a flyback transformer connected with the output terminal of said high voltage generating output transistor for generating flyback pulses thereacross and a high voltage rectifier connected with said flyback transformer for rectifying said flyback pulses generated across said flyback transformer, a voltage source, a variable impedance means connected between said voltage source and said high voltage generating means, and means for supplying a control signal to said variable impedance means in response to a variation of said high D.C. voltage for controlling the voltage supplied to said high voltage generating means thereby to maintain substantially constant said high D.C. voltage supplied to said anode of said cathode-ray tube.

Other objects, features and advantages of the present invention will be apparent from the following detailed description taken in conjunction with the accompanying drawings.

DESCRIPTION OF THE PREFERRED EMBODIMENTS

Figure 1:
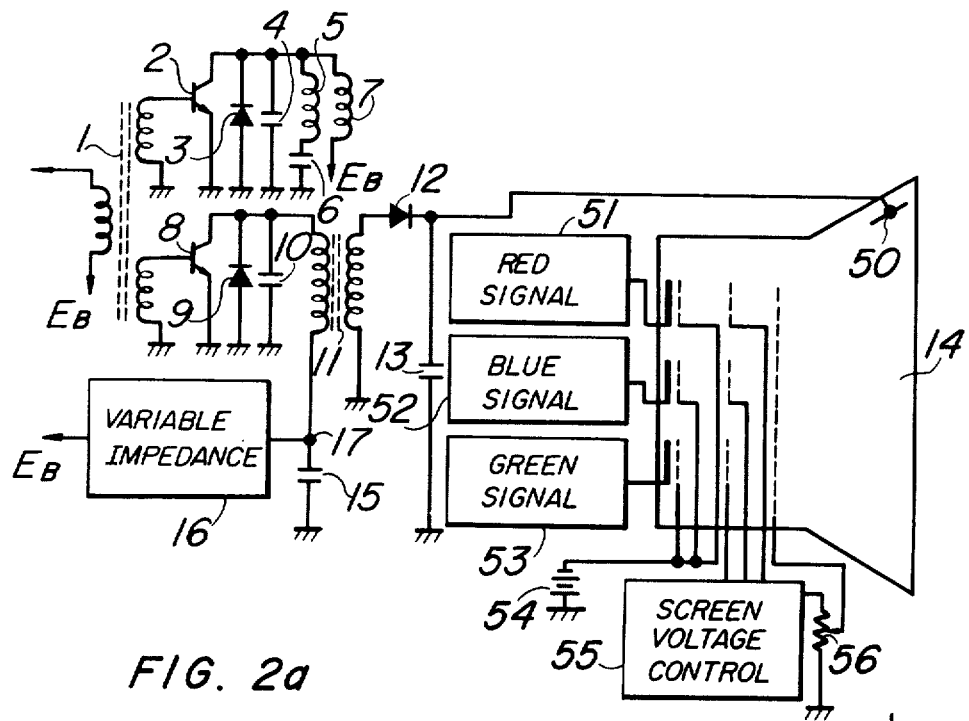
FIGS. 1, 2a and 2b are schematic diagrams illustrating the basic structure of a high voltage regulating circuit according to the present invention.

Referring now to FIG. 1 illustrating the basic structure of a high voltage regulating circuit according to the present invention, horizontal deflection means includes a transistor driver pulse transformer 1 having one end of its primary winding connected to the output terminal of a preceding driver transistor (not shown) and the other end of its primary winding connected to a source of $E_B$ voltage, a horizontal deflection output transistor 2, a damper diode 3, a parallel resonance capacitor 4 connected in parallel with a horizontal deflection coil 5 for determining the horizontal flyback period by resonating with the horizontal deflection coil 5, a capacitor 6 for forming an S like shape in the saw-tooth horizontal deflection current, and a choke coil 7 for the supply of power having one end thereof connected to the source of the $E_B$ voltage. High voltage generating means includes a high voltage generating output transistor 8, a damper diode 9, a parallel resonance capacitor 10, a flyback transformer 11 whose primary winding acts in a manner similar to the deflection coil 5, a high voltage rectifying diode 12 for rectifying high voltage pulses generated across the secondary side of the flyback transformer 11 during the horizontal flyback period, and a high voltage smoothing capacitance 13 which is generally the tube wall capacitance of a cathode-ray tube 14. A smoothing capacitor 15 is connected to the primary winding of the flyback transformer 11, and the cathode-ray tube 14 includes an anode 50. A variable impedance means 16, which is provided according to the present invention, is connected between the source of $E_B$ supply voltage and the junction point 17 between the primary winding of the flyback transformer 11 and the smoothing capacitor 15. The cathode-ray tube 14 is provided with output circuits 51, 52 and 53 of red, blue and green color signals, a source 54 of grid bias supply, a screen voltage control circuit 55, and a variable resistor 56 for adjusting the focusing voltage. In FIG. 1 showing the separated horizontal deflection and high voltage generation system, the elements 1 to 7 cooperate to generate the horizontal deflection current, while the elements 8 to 13 cooperate to generate the high voltage. The operation of the horizontal deflection means and high voltage generating means is well known in the art and any description as to it is unnecessary.

Figure 2A:
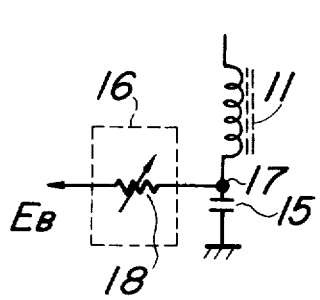
Figure 2B:
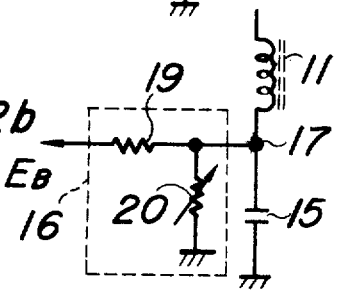

The variable impedance means 16 shown in FIG. 1 has a structure as shown in FIG. 2a or 2b. Referring to FIG. 2a, the variable impedance means 16 comprises a variable resistor 18 which is connected between the source of $E_B$ voltage and the junction point 17. Referring to FIG. 2b, the variable impedance means 16 comprises a resistor 19 and a variable resistor 20. The source of $E_B$ voltage is connected to ground through the resistor 19 and the variable resistor 20, while the junction point between the resistor 19 and the variable resistor 20 is connected to the junction point 17.

The present invention serves to stabilize the high voltage supplied to the anode 50 of the cathode-ray tube 14 by suitably varying the resistance of the variable resistors 18 and 20 depending on a variation of the high voltage. More precisely, in the circuit shown in FIG. 2a, the resistance of the variable resistor 18 is decreased to increase the voltage supplied to the junction point 17 in response to a reduction in the high voltage, while the resistance of the variable resistor 18 is increased to decrease the voltage supplied to the junction point 17 in response to an increase in the high voltage, thereby maintaining the high voltage substantially constant. In the circuit shown in FIG. 2b, the resistance of the variable resistor 20 is increased to increase the voltage supplied to the junction point 17 in response to a reduction in the hig voltage, while the resistance of the variable resistor 20 is decreased to decrease the voltage supplied to the junction point 17 in response to an increase in the high voltage, thereby maintaining the high voltage substantially constant.

In a system employing a single output transistor for the horizontal deflection and high voltage generation, usually, a variation of the voltage supplied to the primary winding of the flyback transformer results undesirably in a variation of the amplitude of the saw-tooth horizontal deflection current flowing through the deflection coil, hence in a variation of the magnitude of the picture. However, in accordance with the present invention which employs the separated horizontal deflection and high voltage generation system, a variation of the voltage supplied to the high voltage generating means would not in any way adversely affect the sawtooth horizontal deflection current.

Various embodiments of the present invention will now be described in detail with reference to FIGS. 3 to 6 in which like reference numerals are used to denote like parts appearing in FIG. 1.

Figure 3:
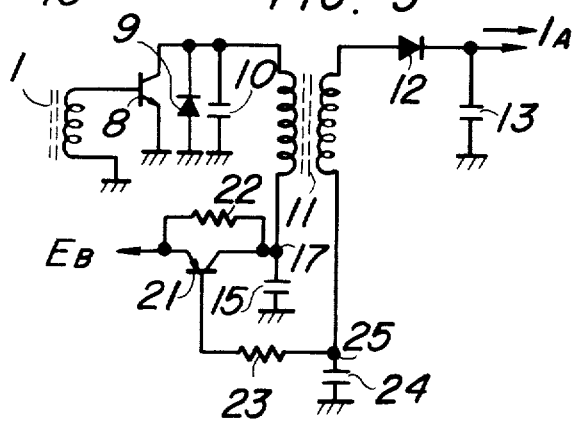
FIGS. 3 to 6 are schematic diagrams of various embodiments of the present invention.

Referring to FIG. 3, the source of $E_B$ voltage is connected to the emitter of a variable impedance transistor 21 whose collector is connected to the junction point 17, and a resistor 22 is connected in parallel with the transistor 21. The base of the transistor 21 is connected through a resistor 23 to the junction point 25 between a capacitor 24 and the secondary winding of the flyback transformer 11. The resistor 23 and the capacitor 24 in this circuit are used to smooth out the anode current flowing through the base of the transistor 21. The power supply voltage $E_B$ is reduced by the resistor 22 and the transistor 21 so that the reduced voltage is supplied to the junction point 17. The resistor 22 is provided so as to reduce the power loss in the transistor 21 by by-passing a constant current component, which has no relation with the variation of the high voltage load, in the direct current flowing into the high voltage generating means, but the provision of the resistor 22 is not an absolutely essential condition of the present invention.

In the circuit shown in FIG. 3, the high voltage varies depending on the anode current $I_A$ of the cathode-ray tube 14. That is, a reduction in the high voltage results in an increase in the anode current $I_A$, while an increase in the high voltage results in a decrease in the anode current $I_A$. Sine the anode current $I_A$ in this circuit is the base current of the transistor 21, an increase in the high voltage to such an extent that the anode current $I_A$ is decreased to zero results in the cut-off of the transistor 21, and a voltage $E_B' = E_B - R.I_{DC}$ (where R is the resistance of the resistor 22 and $I_{DC}$ is the current flowing through the resistor 22) appears at the junction point 17. Therefore, the voltage supplied to the junction point 17 is reduced so as to reduce the high voltage. On the other hand, when the anode current $I_A$ is increased, a reduction in the high voltage occurs to increase the base current of the transistor 21 and the internal resistance of the transistor 21 is decreased. Finally, the transistor 21 is urged into the saturation region and the internal resistance of the transistor 21 becomes substantially zero with the result that an increased voltage $E_B' \approx E_B$ appears at the junction point 17 thereby increasing the high voltage. In this manner, the high voltage can be maintained substantially constant.

Figure 4:
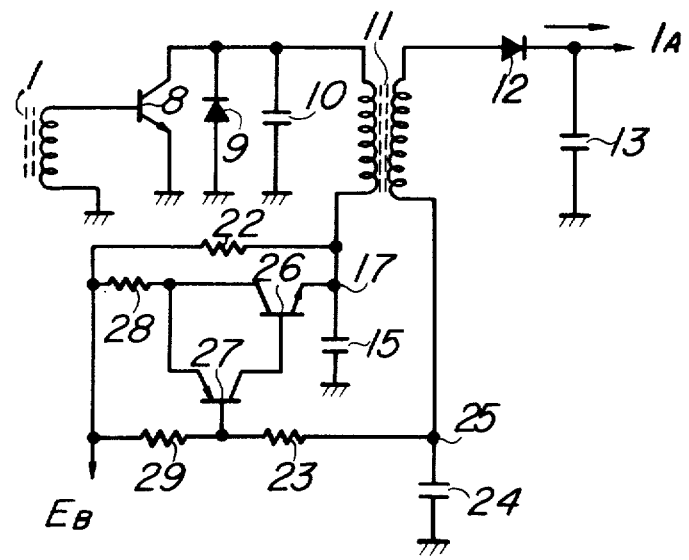

FIG. 4 is a schematic diagram showing another embodiment of the high voltage regulating circuit according to the present invention. Referring to FIG. 4, a pair of compound-connected transistors 26 and 27 corresponds to the variable resistor 18 shown in FIG. 2a. A resistor 28 is connected between the source of $E_B$ voltage and the collector of the transistor 26, hence the emitter of the transistor 27, and a resistor 29 is connected between the source of $E_B$ voltage and the base of the transistor 27. The compound-connected transistors 26 and 27 operate in a manner similar to a single transistor. That is, the circuit shown in FIG. 4 is analogous to the circuit shown in FIG. 3 in which the transistor 26 is removed and the collector of the transistor 27 is connected to the junction point 17. Thus, the operation of the circuit shown in FIG. 4 is similar to that of the circuit shown in FIG. 3 and the high voltage can be similarly maintained substantially constant.

The circuit shown in FIG. 4 differs from the circuit shown in FIG. 3 in that the resistors 28 and 29 are additionally provided in the former. The resistor 28 in FIG. 4 serves as the emitter resistor for the compound-connected transistors 26 and 27, while the resistor 29 serves as the base resistor for these transistors. Thus, these resistors 28 and 29 compensate for the characteristics (hfe, $V_{BE}$, $I_{CBO}$, etc.) of the transistors 26 and 27 thereby improving the stability of the circuit.

Figure 5:
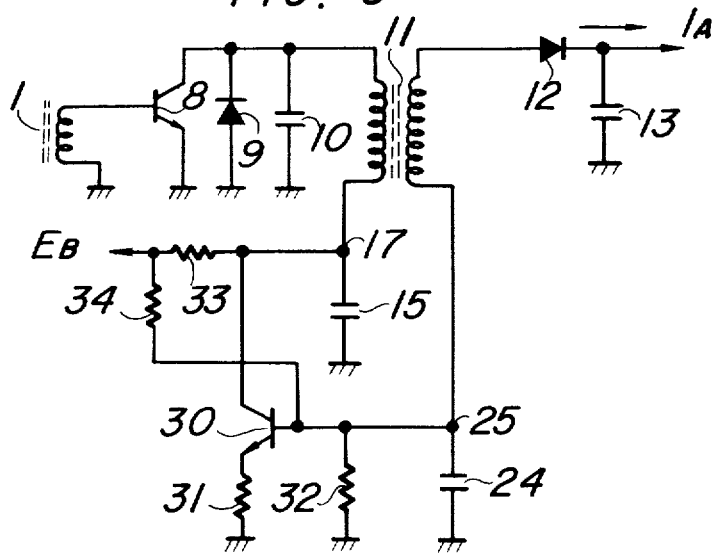

FIG. 5 is a schematic diagram of a further embodiment of the high voltage regulating circuit according to the present invention and this embodiment is based on the principle shown in FIG. 2b. Referring to FIG. 5, a transistor 30 corresponds to the variable resistor 20 shown in FIG. 2b. The transistor 30 has its collector connected to the junction point 17, its emitter grounded through a resistor 31 and its base connected to the junction point 25 and grounded through a resistor 32. The source of $E_B$ voltage is connected to the junction point 17 through a resistor 33 and is also connected to the base of the transistor 30 through a resistor 34.

In the circuit shown in FIG. 5, the anode current $I_A$ of the cathode-ray tube 14 and the base current of the transistor 30 are supplied through the resistor 34. Thus, when the anode current $I_A$ is increased, the base voltage of the transistor 30 is reduced and the base current is decreased. When, on the contrary, the anode current $I_A$ is decreased, the base current is increased. In response to an increase in the high voltage and a decrease in the anode current $I_A$, the base current of the transistor 30 is increased and the resistance of the transistor 30 is decreased. Since the power supply voltage $E_B$ is divided by the resistor 33, transistor 30 and resistor 31 and such divided voltage appears at the junction point 17, the reduction in the resistance of the transistor 30 results in a reduction of the voltage supplied to the junction point 17, that is the high voltage is reduced. On the other hand, in response to an increase in the anode current $I_A$ and a reduction in the high voltage, the base current of the transistor 30 is decreased and the resistance of the transistor 30 is increased so that the voltage appearing at the junction point 17 is increased, that is, the high voltage is increased. In this manner, the embodiment shown in FIG. 5 maintains the high voltage at a substantially constant value.

Figure 6:
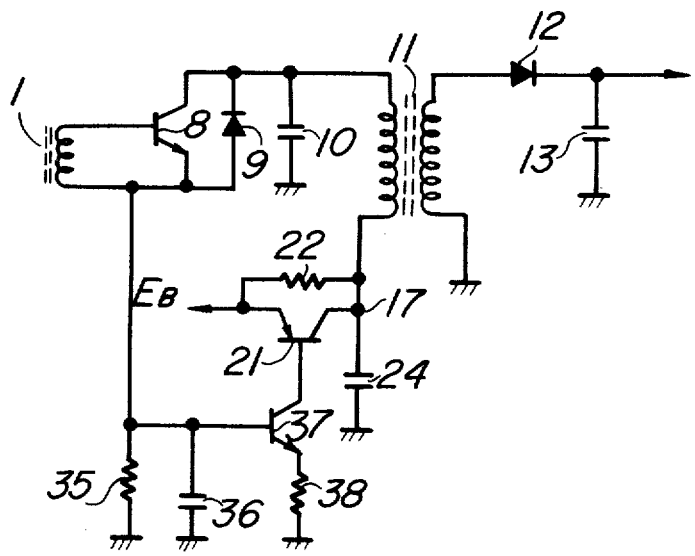

FIG. 6 is a schematic diagram of another embodiment of the high voltage regulating circuit according to the present invention and this embodiment is based on the principle shown in FIG. 2a. The present embodiment differs from the embodiments shown in FIGS. 3, 4 and 5 in the manner of controlling the variable resistor 18. Referring to FIG. 6, the emitter of the high voltage generating output transistor 8 is grounded through a parallel circuit composed of a resistor 35 and a bypass capacitor 36 and is further connected to the base of a driver transistor 37 for the transistor 21. The transistor 37 has its collector connected to the base of the transistor 21 and its emitter grounded through a stability improving emitter resistor 38. The resistor 35 and the capacitor 36 constitute a smoothing circuit for smoothing out the emitter current of the output transistor 8. The emitter current of the transistor 8 is substantially proportional to the current flowing through the primary winding of the flyback transformer 11, and the current flowing through the primary winding of the flyback transformer 11 is increased and decreased depending on the increase and decrease in the anode current $I_A$ of the cathode-ray tube 14.

Therefore, the base current of the transistor 37 is increased and decreased depending on the increase and decrease in the anode current $I_A$. The decrease in the anode current $I_A$ results in an increase in the high voltage so that the base current of the transistor 37 and the collector current of the transistor 37 are decreased, hence the base current of the transistor 21 is decreased. As a result, the resistance of the transistor 21 is increased and the voltage supplied to the junction point 17 is decreased, that is, the high voltage is reduced. On the other hand, the increase in the anode current $I_A$ results in a reduction in the high voltage so that the base current and collector current of the transistor 37, hence the base current of the transistor 21 is increased and the internal resistance of the transistor 21 is decreased. As a result, the voltage at the junction point 17 is increased and the high voltage is increased. Thus, the high voltage is maintained at a substantially constant value.

It will be understood from the foregoing description that the present invention is based on a separated horizontal deflection and high voltage generation system and employs a variable impedance means such as a transistor whose impedance is variable depending on a variation of the high voltage so as to vary the voltage supplied to the high voltage generating means thereby stabilizing the high voltage. Thus, a highly stable high voltage regulating circuit of satisfactory performance can be obtained which overcomes the defects of prior art high voltage regulating circuits using a shunt regulator tube.

We claim:

1. A high voltage regulating circuit comprising;
   a cathode-ray tube having at least a cathode, a grid and an anode;
   horizontal deflection means including a horizontal deflection output transistor and a horizontal deflection coil connected with the output terminal of said deflection output transistor for generating a sawtooth current therein;
   high voltage generating means connected with said anode of said cathode-ray tube for supplying a high D.C. voltage thereto and including a high voltage generating output transistor, a flyback transformer connected with the output terminal of said high voltage generating output transistor for generating flyback pulses thereacross and a high voltage rectifier connected with said flyback transformer for rectifying said flyback pulses generated across said transformer;
   a voltage source for supplying a voltage to said high voltage generating means;
   a transistor having an input terminal connected with said voltage source, an output terminal connected with a terminal of said flyback transformer, and a control terminal;
   and means for supplying a control signal to said control terminal of said transistor in response to a variation of said high D.C. voltage for varying the impedance value of said transistor and controlling said voltage supplied to said terminal of said flyback transformer, whereby said high D.C. voltage supplied to said anode of said cathode-ray tube is kept substantially constant.

2. A high voltage regulating circuit comprising;

a cathode-ray tube having at least a cathode, a grid and an anode;

horizontal deflection means including a horizontal deflection output transistor and a horizontal deflection coil connected with the output terminal of said deflection output transistor for generating a sawtooth current therein;

high voltage generating means connected with said anode of said cathode-ray tube for supplying a high D.C. voltage thereto and including a high voltage generating output transistor, a flyback transformer connected with the output terminal of said high voltage generating output transistor for generating flyback pulses thereacross and a high voltage rectifier connected with said flyback transformer for rectifying said flyback pulses generated across said transformer;

a voltage source for supplying a voltage to said high voltage generating means;

a transistor having a first terminal connected with said voltage source, a second terminal connected with a terminal of a first winding of said flyback transformer and a control terminal connected with a terminal of a second winding of said flyback transformer for supplying a control signal in response to a variations of said high D.C. voltage, so that the impedance value of said transistor is varied and the voltage supplied to said terminal of said first winding of said flyback transformer is controlled depending on said high D.C. voltage, whereby said high D.C. voltage supplied to said anode of said cathode-ray tube is kept substantially constant.

3. A high voltage regulating circuit according to claim 2, wherein a resistor is connected between said first terminal and said second terminal of said transistor, for bypassing a constant D.C. component which does not have any relation with the variation of the high voltage load, in the current supplied to said flyback transformer.

4. A high voltage regulating circuit comprising;

a cathode-ray tube having at least a cathode, a grid and an anode;

horizontal deflection means including a horizontal deflection output transistor and a horizontal deflection coil connected with the output terminal of said deflection output transistor for generating a sawtooth current therein;

high voltage generating means connected with said anode of said cathode-ray tube for supplying a high D.C. voltage thereto and including a high voltage generating output transistor, a flyback transformer connected with the output terminal of said high voltage generating output transistor for generating flyback pulses thereacross and a high voltage rectifier connected with said flyback transformer for rectifying said flyback pulses generated across said transformer;

a voltage source for supplying a voltage to said high voltage generating means;

a variable impedance means including a resistor connected between said voltage source and a terminal of a first winding of said transformer and a transistor having a first terminal connected with said terminal of said first winding of said transformer, a second terminal connected with a point of reference potential and a control terminal connected with a terminal of a second winding of said transformer for supplying a control signal in response to a variation of said high D.C. voltage so that the impedance value of said transistor is varied and the voltage supplied to said terminal of said first winding of said flyback transformer is controlled depending on said high D.C. voltage, whereby said high D.C. voltage supplied to said anode of said cathode-ray tube is kept substantially constant.

5. A high voltage regulating circuit comprising;

a cathode-ray tube having at least a cathode, a grid and an anode;

horizontal deflection means including a horizontal deflection output transistor and a horizontal deflection coil connected with the output terminal of said deflection output transistor for generating a saw-tooth current therein;

high voltage generating means connected with said anode of said cathode-ray tube for supplying a high D.C. voltage thereto and including a high voltage generating output transistor having a collector and an emitter, a flyback transformer connected with said collector of said high voltage generating output transistor for generating flyback pulses thereacross and a high voltage rectifier connected with said flyback transformer for reactifying said flyback pulses generated across said transformer;

a voltage source for supplying a voltage to said high voltage generating means;

a transistor having a first terminal connected with said voltage source, a second terminal connected with a terminal of a first winding of said flyback transformer and a control terminal connected with said emitter of said high voltage generating output transistor for supplying a control signal in response to a variation of said high D.C. voltage, so that the impedance value of said transistor is varied and the voltage supplied to said terminal of said first winding of said flyback transformer is controlled depending on said high D.C. voltage, whereby said high D.C. voltage supplied to said anode of said cathode-ray tube is kept substantially constant.

6. A high voltage regulating circuit comprising:

a cathode ray tube having at least a cathode, a grid and an anode;

horizontal deflection means including a horizontal deflection output transistor and a horizontal deflection coil connected with the output terminal of said deflection output transistor for generating a sawtooth current therein;

high voltage generating means connected with said anode of said cathode ray tube for supplying a high D.C. voltage thereto and including a high voltage generating output transistor, a flyback transformer connected with the output terminal of said high voltage generating output transistor for generating flyback pulses thereacross and a high voltage rectifier connected with said flyback transformer for rectifying said flyback pulses generated across said transformer;

a voltage source for supplying a voltage to said high voltage generating means;

a variable impedance means comprising a transistor connected between said voltage source and a terminal of a first winding of said flyback transformer;

and means for supplying a control signal to a control terminal of said transistor in response to a variation of said high D.C. voltage for varying the value of said variable impedance means and controlling said voltage supplied to said terminal of said first winding of said flyback transformer, thereby said high D.C. voltage supplied to said anode of said cathode ray tube being kept substantially constant.

7. A high voltage regulating circuit comprising:
a cathode ray tube having at least a cathode, a grid and an anode;
horizontal deflection means including a horizontal deflection output transistor and a horizontal deflection coil connected with the output terminal of said deflection output transistor for generating a sawtooth current therein;
high voltage generating means connected with said anode of said cathode ray tube for supplying a high D.C. voltage thereto and including a high voltage generating output transistor, a flyback transformer connected with the output terminal of said high voltage generating output transistor for generating flyback pulses thereacross and a high voltage rectifier connected with said flyback transformer for rectifying said flyback pulses generated across said transformer;
a voltage source for supplying a voltage to said high voltage generating means;
a pair of compound-connected transistors having a first terminal connected with said voltage source, a second terminal connected with a terminal of a first winding of said flyback transformer and a control terminal connected with a terminal of a second winding of said flyback transformer for supplying a control signal in response to variations of said high D.C. voltage, so that the impedance value of said transistor is varied and the voltage supplied to said terminal of said first winding of said flyback transformer is controlled depending on said high D.C. voltage, thereby said high D.C. voltage supplied to said anode of said cathode ray tube being kept substantially constant.

8. A high voltage regulating circuit for use in a television receiver comprising:
a detector means for detecting a beam current supplied from a power source, one terminal of said detector means being connected to said power source,
a flyback transformer including a secondary winding having hot and cold terminals, the hot terminal thereof being connected to the anode of a cathode ray tube of said receiver and the cold terminal thereof being connected to the other terminal of said detector means,
a horizontal deflection output transistor for generating a sawtooth current in a horizontal deflection coil,
a high voltage output transistor, and
a control circuit including a control transistor connected in series in an energizing circuit from said power source to said high voltage output transistor, for controlling voltage to be applied to said high voltage output transistor, said control circuit being controlled by the output of said detector means.

9. A high voltage regulating circuit as recited in claim 8 wherein there is further provided: a filter connected between said other terminal of said detector means and said cold terminal of said secondary winding of said flyback transformer, said filter including a resistor for effecting said connection therebetween and a capacitor connected between the junction of said resistor and said cold terminal and ground.

10. A high voltage regulating circuit as recited in claim 8 wherein said high voltage output transistor provides an output to the primary winding of said transformer, the secondary winding thereof providing the high voltage output for supply to the anode of the cathode ray tube.

11. A high voltage regulating circuit as recited in claim 8 wherein said horizontal deflection output transistor is connected between ground potential and said power source for energizing said horizontal deflection coil of said cathode ray tube, and said high voltage and said horizontal deflection output transistors are coupled to a drive transistor to be driven in conduction in common by the output of said drive transistor.

12. A high voltage regulating circuit as recited in claim 8 wherein there is further provided a filter connected between said detector and said cold terminal of said secondary winding of said flyback transformer.

13. A high voltage regulating circuit as recited in claim 8 wherein said control transistor of said control circuit is connected in its collector-emitter conducting path in series from said power source and through said primary winding of said flyback transformer to the collectoremitter conducting path of said high voltage output transistor, and said detector is connected between said power source and the base of said transistor of said control circuit.

14. A high voltage regulating circuit as recited in claim 13 wherein said detector comprises resistive means.

* * * * *